(12) United States Patent
Morrish

(10) Patent No.: US 8,169,763 B2
(45) Date of Patent: May 1, 2012

(54) TRANSIENT BLOCKING UNIT HAVING AN ENHANCEMENT MODE DEVICE IN THE PRIMARY CURRENT PATH

(75) Inventor: Andrew J. Morrish, Saratoga, CA (US)

(73) Assignee: Bourns, Inc., Riverside, CA (US)

( * ) Notice: Subject to any disclaimer, the term of this patent is extended or adjusted under 35 U.S.C. 154(b) by 55 days.

(21) Appl. No.: 12/653,887

(22) Filed: Dec. 18, 2009

(65) Prior Publication Data

US 2010/0103574 A1    Apr. 29, 2010

Related U.S. Application Data

(63) Continuation-in-part of application No. 12/456,882, filed on Jun. 23, 2009.

(60) Provisional application No. 61/133,400, filed on Jun. 26, 2008.

(51) Int. Cl.
H02H 3/08 (2006.01)
H02H 9/02 (2006.01)
H02H 9/00 (2006.01)

(52) U.S. Cl. ......................... 361/93.1; 361/58

(58) Field of Classification Search ............... 361/58, 361/93.1
See application file for complete search history.

(56) References Cited

U.S. PATENT DOCUMENTS

| 3,916,220 A | 10/1975 | Roveti |
| 4,533,970 A | 8/1985 | Brown |
| 4,847,720 A * | 7/1989 | Dezonno ................... 361/18 |
| 7,324,315 B2 * | 1/2008 | Harris ...................... 361/58 |
| 7,342,433 B2 | 3/2008 | Harris et al. |
| 2006/0098365 A1 | 5/2006 | Harris et al. |
| 2009/0231773 A1 | 9/2009 | Morrish |

* cited by examiner

*Primary Examiner* — Dharti Patel
(74) *Attorney, Agent, or Firm* — Luman Patent Firm (57) ABSTRACT

A transient blocking unit (TBU) is a circuit having series-connected transistors that normally conduct current, but automatically switch to a high-impedance current blocking state in response to an over-current condition. Here enhancement mode devices are used in the primary TBU current path, as opposed to the conventional use of depletion mode devices in this context. This approach provides two main advantages. The first advantage is that the dependence of TBU parameters on poorly controlled depletion mode device parameters can be reduced or eliminated. The second advantage is that such TBUs can provide over-voltage protection in addition to over-current protection.

9 Claims, 7 Drawing Sheets

TRANSIENT BLOCKING UNIT HAVING AN ENHANCEMENT MODE DEVICE IN THE PRIMARY CURRENT PATH

CROSS REFERENCE TO RELATED APPLICATIONS

This application is a continuation in part of application Ser. No. 12/456,882, filed on Jun. 23, 2009, entitled "Voltage Triggered Transient Blocking Unit", and hereby incorporated by reference in its entirety. Application Ser. No. 12/456,882 claims the benefit of U.S. provisional patent application 61/133,400, filed on Jun. 26, 2008, entitled "Voltage Triggered Transient Blocking Unit", and hereby incorporated by reference in its entirety.

FIELD OF THE INVENTION

This invention relates to protection of electrical loads from electrical transients.

BACKGROUND

A transient blocking unit (TBU) is an arrangement of two or more transistors connected to each other in series such that they automatically switch off when a TBU current passing through these transistors exceeds a predetermined threshold. As the TBU current increases, voltage drops across the TBU transistors are provided as gate voltages to the TBU transistors that tend to turn these transistors off. When the TBU current is below threshold, this turning-off effect is negligible, and the TBU resistance is low. When the TBU current goes above threshold, the turning-off effect is strong enough to cause positive feedback, which leads to rapid and automatic switching of the TBU to a high-resistance off state. The positive feedback in this situation arises from the tendency of an increasing gate voltage on a TBU transistor to increase the voltage drop across that TBU transistor, and this increased voltage drop is provided as a gate voltage to another TBU transistor. The TBU circuit connections are such that positive feedback can result from these increasing transistor and gate voltages.

Figure 1:
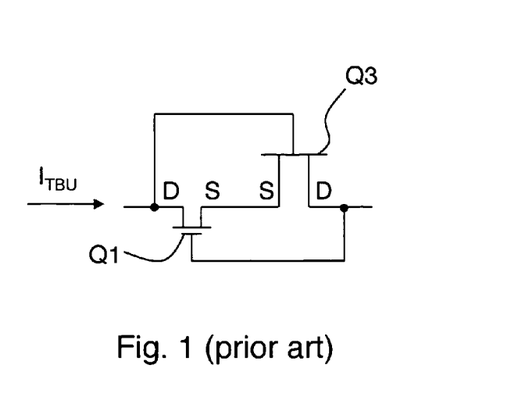
FIG. 1 is a schematic of a prior art transient blocking unit.

FIG. 1 shows a simple example of a conventional TBU. In this example, two depletion mode (i.e., normally-on) transistors, Q1 and Q3, are connected in series such that the same current $I_{TBU}$ flows through Q1 and Q3. As $I_{TBU}$ increases, $V_{DS}$ of Q1 and $V_{SD}$ of Q3 both increase. The transistor types are selected such that as $V_{DS}$ of Q1 increases, the voltage applied to the gate of Q3 acts to shut off Q3. Similarly, as $V_{SD}$ of Q3 increases, the voltage applied to the gate of Q1 acts to shut off Q1. The positive feedback inherent in this arrangement leads to a rapid transition of the TBU from a normal low-impedance state to a high-impedance current blocking state once $I_{TBU}$ exceeds a predetermined threshold. In operation, a TBU can switch to its high-impedance state in response to an over-current condition from an electrical transient, thereby protecting electrical devices or circuits connected to the TBU.

Figure 2:
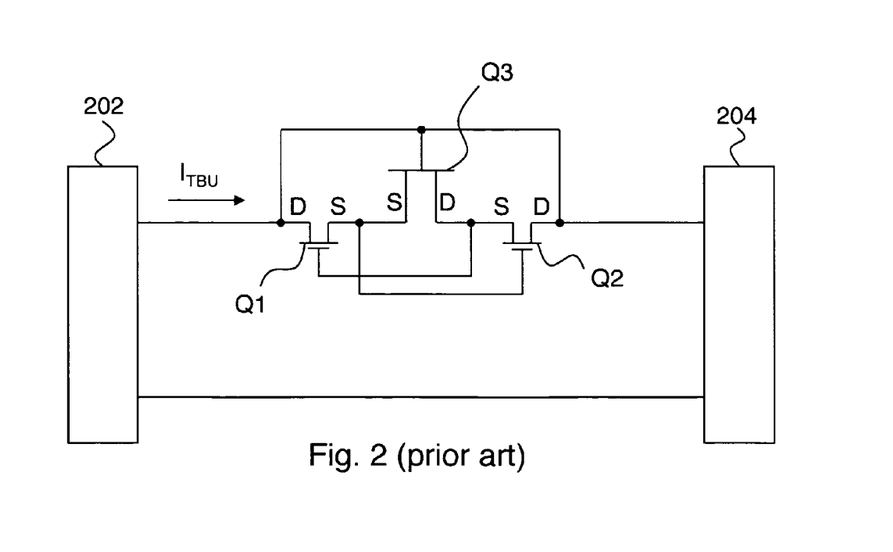
FIG. 2 is another schematic of a prior art transient blocking unit.

The TBU example of FIG. 1 is a unipolar (or uni-directional) TBU because it is only effective to block surges having a predetermined polarity (i.e., either positive surges or negative surges). FIG. 2 shows a conventional bipolar TBU. The circuit of FIG. 2 can be understood as providing two unipolar TBUs having opposite polarity in series. The first unipolar TBU is formed by depletion mode transistors Q1 and Q3, and the second unipolar TBU is formed by depletion mode transistors Q2 and Q3. FIG. 2 also shows a typical application for a TBU, where it is placed in series between an electrical device 202 and a load 204 in order to protect device 202 from transients from load 204. Protection of device 202 is also provided from transients that may develop between the TBU and load 204 (e.g., on a transmission line). If a transient from the load causes the TBU current to exceed the TBU threshold, the TBU will switch to its off state, thereby protecting the device from the transient. Some early examples of TBUs include U.S. Pat. Nos. 3,916,220, 4,533,970, and 5,742,463.

SUMMARY

As indicated above, conventional TBUs rely on the use of depletion mode devices (i.e., normally-on transistors) in the primary current path to provide over-current protection. However, depletion mode MOSFETs tend to be more difficult to fabricate than enhancement mode (i.e., normally-off) MOSFETs. This difficulty leads to higher cost and/or greater parameter variability for depletion mode MOSFETs as compared to enhancement mode MOSFETs. In particular, the TBU threshold current depends on the threshold voltages of the primary path transistors. A poorly controlled depletion mode MOSFET threshold can directly lead to a poorly controlled TBU current threshold, with highly undesirable effects on TBU yield.

Another problem that can arise in connection with conventional TBUs is that a conventional TBU will only switch off if the current passing through the TBU exceeds the TBU threshold. This behavior can lead to impaired device protection in certain circumstances. More specifically, a device being protected by a TBU may not always be able to source or sink the TBU threshold current (e.g., if the protected device is in a standby or sleep mode). In such a situation, a transient on the interface side of the TBU can reach the protected device and possibly damage it.

Figure 3:
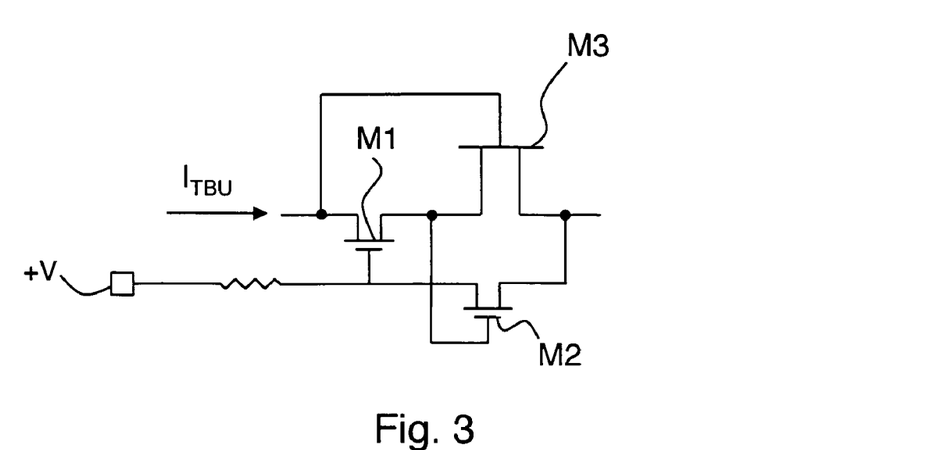
FIG. 3 shows a schematic relating to embodiments of the invention.

In the present application, both of these problems can be addressed by incorporating one or more enhancement mode transistors into the primary TBU current path. FIG. 3 shows an exemplary schematic diagram of this concept. Here, transistors M1 and M2 are enhancement mode MOSFETs, and M3 is a depletion mode junction field effect transistor (JFET). The primary TBU current path passes through transistors M1 and M3. The gate of M2 is connected to the node between M1 and M3, and the gate of M1 is connected to M2. With appropriate biasing (e.g., as shown), a gate voltage at M1 sufficient to turn M1 on is present during normal operation (i.e., TBU current below threshold) and M2 is in the off state. When the TBU current exceeds threshold, the gate voltage at M2 increases due to the voltage drop caused by the current in M3, thereby tending to turn M2 on. As M2 turns on, the gate voltage of M1 is decreased below the turn on threshold of M1, causing it to turn off. The increased voltage developed across M1 as a result of this change causes M3 to turn off. As the impedance of M3 increases, M2 is turned fully on, and the gate voltage at M1 further decreases. The resulting positive feedback leads to rapid and automatic switching of this circuit to a high-impedance current blocking state when the TBU current exceeds threshold. The voltage triggering capability provided by this kind of circuit is explained in connection with the examples described below.

To better appreciate the present approach, it is helpful to compare it to other approaches where enhancement mode transistors have been employed in connection with a TBU. In U.S. Pat. No. 7,342,433, a TBU having depletion mode transistors in the primary current path is modified by adding enhancement mode devices to control gate voltages of the main TBU transistors. More specifically, the gate voltages of the main depletion mode TBU transistors can be controlled by enhancement mode devices to reduce the on-resistance of the TBU.

In US 2009/0231773, auxiliary enhancement mode transistors are added to the basic TBU configuration in order to reduce the dependence of the TBU threshold current on poorly controlled parameters of the depletion mode TBU transistors. Further details relating to enhancement mode assisted TBUs can be found in US published application 2009/0231773, filed on Jan. 27, 2009, and hereby incorporated by reference in its entirety.

In both of these cases, the primary TBU transistors (i.e., the transistors through which the TBU current flows) are all depletion mode devices, as in the examples of FIGS. 1 and 2. The use of depletion mode transistors as the primary transistors in a TBU reduces part count (e.g., as seen by comparing FIGS. 1 and 3), which ordinarily would decisively favor the use of depletion mode devices as the primary TBU transistors. However, it has been found, surprisingly, that the advantages of using enhancement mode devices as primary TBU transistors can often outweigh the disadvantage of increased part count. More specifically, there are two main advantages:
1) enhancement mode MOSFETs with tightly controlled thresholds are easier and lower cost to make than depletion mode MOSFETs, requiring less processing steps; and
2) the enhancement mode devices can be configured such that they form a TBU that switches off when a TBU voltage goes out of range (in addition to the normal TBU capability of providing over-current protection).

DETAILED DESCRIPTION

Figure 4:
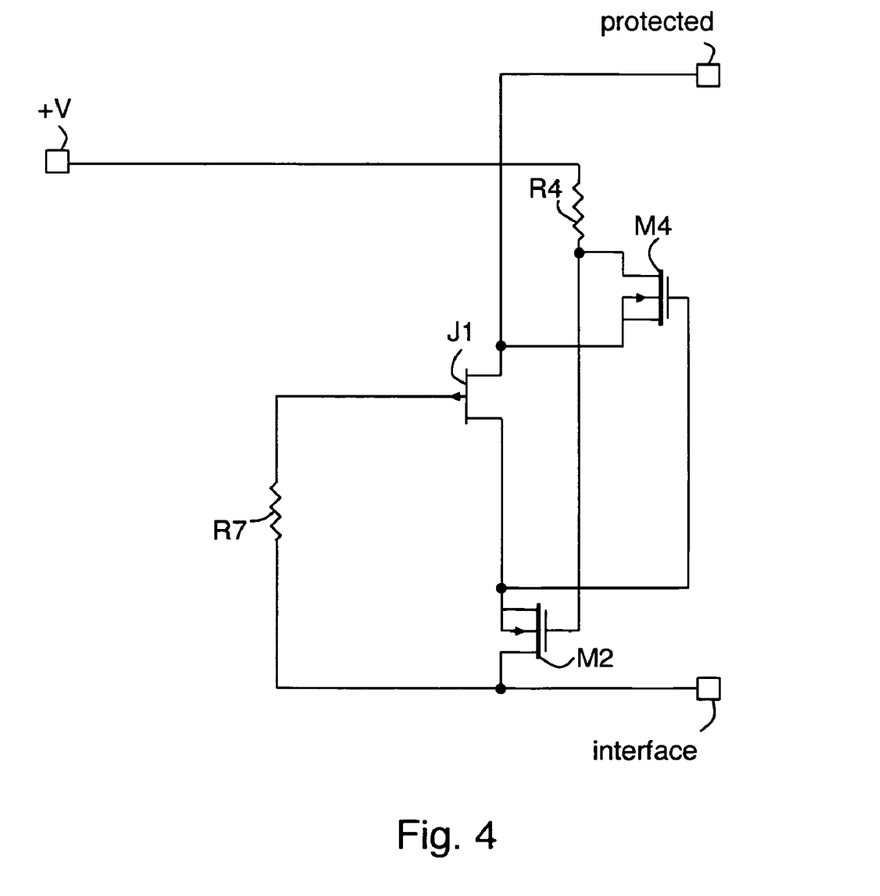
FIG. 4 is a schematic of a first embodiment of the invention.

FIG. 4 is a schematic of a first embodiment of the invention. In this circuit, +V indicates that this is the positive rail. M2 and M4 are enhancement mode devices, and M3 is a depletion mode device. Preferably, M2 and M4 are n-channel metal-oxide field effect transistors (NMOS), and J1 is preferably a p-channel junction field effect transistor (JFET). J1 and M2 are in the primary TBU current path, so these transistors can be referred to as primary transistors. M4 is not in the primary TBU current path, so it is convenient to refer to this transistor as an auxiliary transistor. Here the gate of M2 is connected to M4, and the gate of M4 is connected to the node between J1 and M2. R4 is connected to the positive rail, +V. As long as M4 is off (normal TBU on mode), the gate of M2 is pulled high, which turns it on. (In practice, a zener clamp diode across the drain-source of M4 may be used (not shown) to prevent excessive voltage, or M4 may be allowed to avalanche, in order to protect the gate of M2). The "protected" terminal is the protected side of the TBU, as may be connected to an IC or other equipment being protected. The "interface" terminal is the exposed side of the TBU, where surges may be experienced.

If a surge occurs that pulls the interface positively, if sufficient current flows, then the TBU will act in the normal way of the enhancement mode assisted TBU, in that voltage will be developed across J1 due to the current, which if sufficient, will turn on M4; that in turn will effectively connect (i.e. short) the gate of M2 to the source (or drain) of J1, which in turn will turn off M2. In this way, it is possible to provide TBU current protection capability without the use of depletion mode NMOS devices.

If the protected terminal of the TBU is connected to a high resistance protected device, then current flow may not suffice to trip the TBU. In this case, the protected terminal will also be dragged positive towards +V. If the rate of change of voltage is relatively slow, then when the source of M2 approaches +V, R4 will hold the gate of M2 at +V, thus causing M2 to turn off. Thus the TBU is also turned off by any surge which forces the TBU above the positive rail.

In practice, M2 is usually a fairly large NMOS and thus has significant gate capacitance. In this case, because of the long RC time constant formed by the gate capacitance and R4, the TBU will only turn off as a result of slow moving surges, but may not be fast enough to react to, say 60 Hz mains AC, which is a prime requirement for protection devices. To increase turn off speed, the circuit can be modified by the use of two addition small enhancement mode devices M5 and M6 devices.

Figure 5:
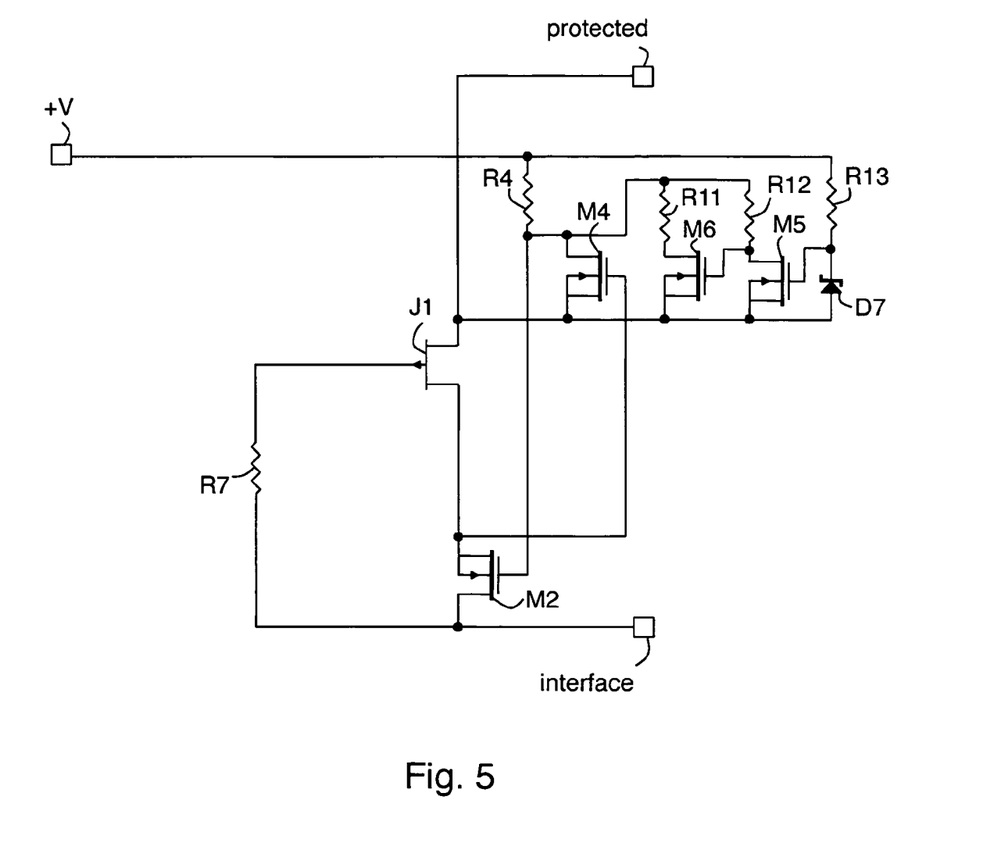
FIG. 5 is a schematic of a second embodiment of the invention.

The resulting circuit is shown in FIG. 5. Here, M5 and M6 act as a simple comparator. In this circuit, M5 is normally turned fully on by the positive bias applied through resistor R13, which turns M6 fully off, and the circuit behaves as described above, with the exception that now a potential divider is formed by R4 and R12. This difference does not substantially alter the operation or effect of the circuit.

Now when the positive surge occurs, M5 is turned off as its source approaches +V, because the gate of M5 is tied to +V through R13. M5 is relatively very small, so its gate capacitance is low. Hence it reacts quickly as the gate drive decreases, and turns off as the interface node approaches +V. When M5 turns off, M6 is turned on, by voltage applied through R12, sinking current and discharging any gate charge of NMOS M2 through R11, which is of relatively low value. In this manner, a low resistance gate capacitance discharge path can be provided for M2.

In the preceding examples, a TBU with uni-directional current blocking capability is considered. The present approach is also applicable to bi-directional TBUs.

Figure 6:
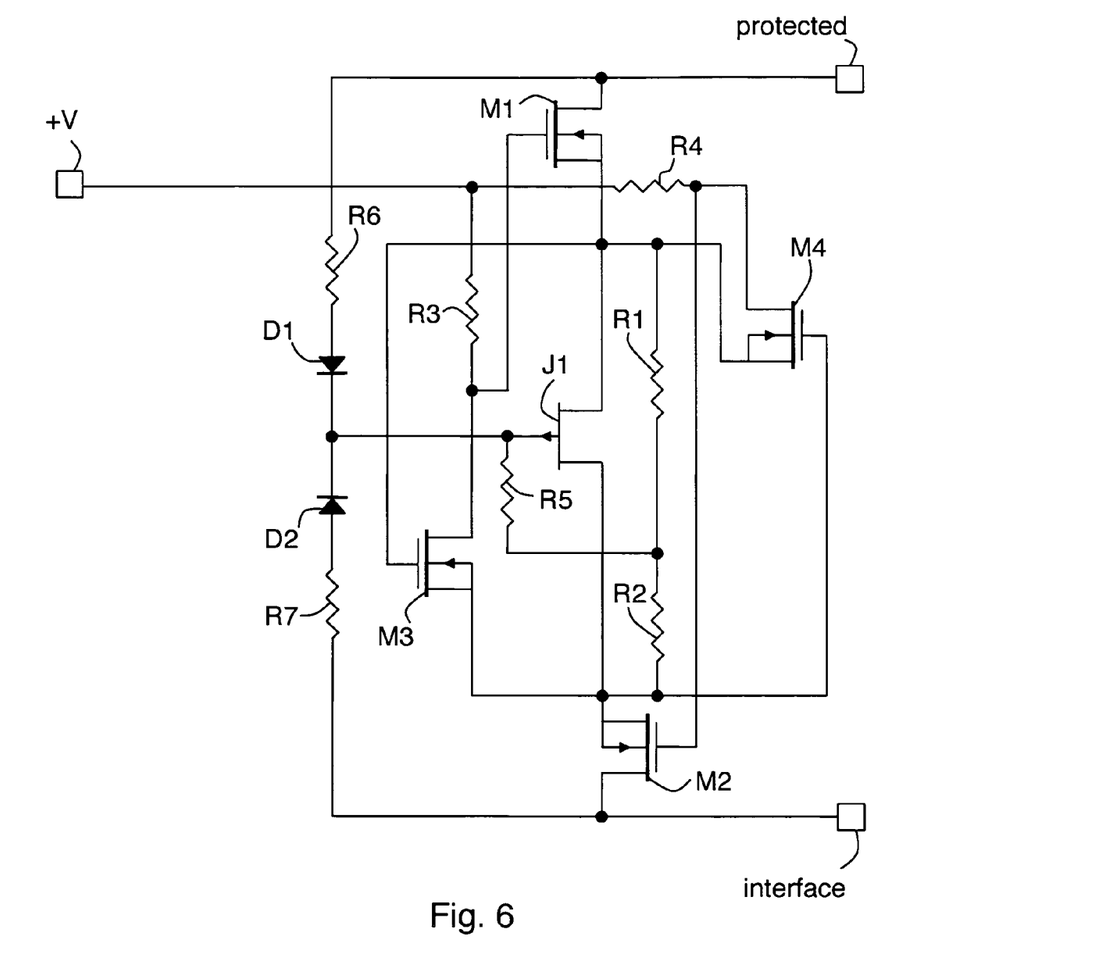
FIG. 6 is a schematic of a third embodiment of the invention.

One example of a bi-directional TBU according to the present work is shown on FIG. 6. In this circuit, +V indicates that this is the positive rail. M1, M2 and J1 are in the primary TBU current path. M1 and M2 are enhancement mode devices, and J1 is a depletion mode device. Auxiliary transistors M3 and M4 are also enhancement mode devices, but they are not in the primary TBU current path. Auxiliary transistors M3 and M4 correspond to primary transistors M1 and M2 respectively. Preferably, M1, M2, M3, and M4 are NMOS devices, and J1 is preferably a p-channel JFET. R3 and R4 are connected to the positive rail, +V. As long as M3 and M4 are off (normal TBU on mode), the gates of the two HV NMOS M1 and M2 are pulled high, which turns them on. (In practice, a zener clamp diode across the drain-source of M3 and M4 may be used (not shown) to prevent excessive voltage, or these devices may be allowed to avalanche, in order to protect the gates of M1 and M2).

For surges that pull the interface positively, this circuit operates substantially like the circuit of FIG. 4, and provides both over-current and over-voltage protection. The network formed by R6, R7, D1, and D2 ensures proper TBU feedback voltages are present at the gate of J1. Diodes D1 and D2 prevent the resistors from acting as a potential divider, which would decrease the feedback voltage by a factor of 2, thereby decreasing the sensitivity of the TBU. If a negative surge occurs and sufficient current flows, the voltage developed across J1 will turn on M3, which in turn will short the gate of M1 to the source of M2, which in turn will turn off M1. In this way, it is possible to provide bi-directional TBU current protection capability without the use of depletion mode NMOS devices.

The circuit of FIG. 6 can be modified to improve the switching speed of M2 by providing a low resistance gate capacitance discharge path.

Figure 7:
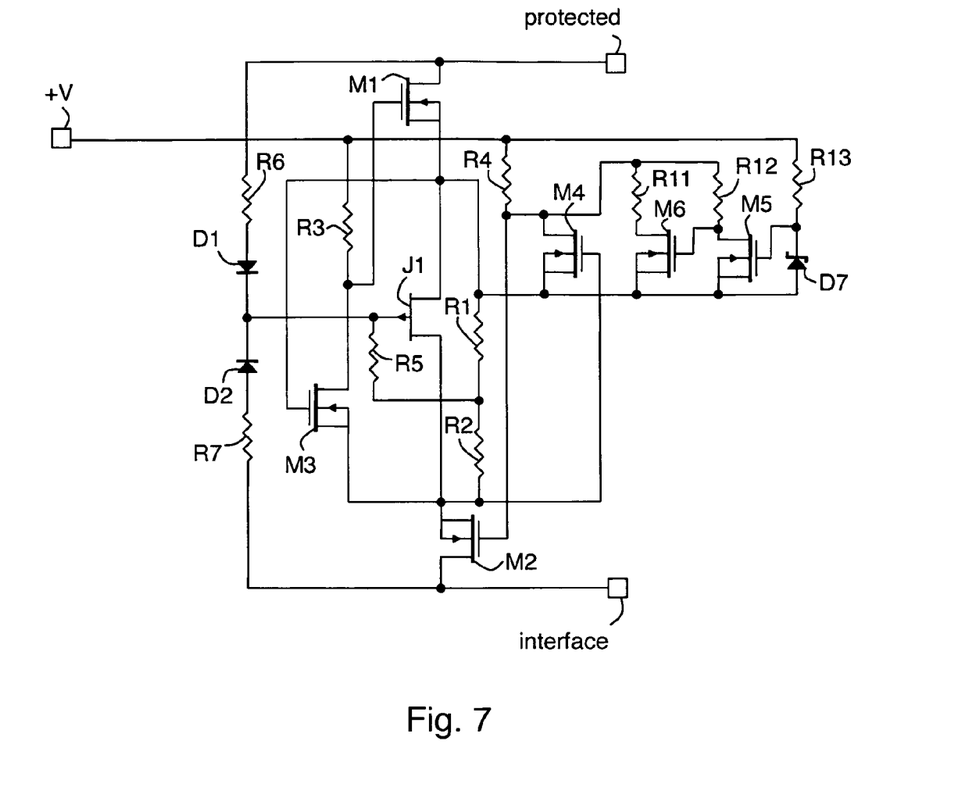
FIG. 7 is a schematic of a fourth embodiment of the invention.

FIG. 7 is an example of such a modified circuit. In this circuit, the network formed by R1, R2, and R5 provides a voltage reference to transistors M4, M5, and M6 so they can act as a voltage comparator as described above in connection with FIG. 5.

In the examples of FIGS. 6 and 7, bi-directional protection for over-current conditions is provided, but over-voltage protection is uni-directional. For example, a negative going surge that causes over-voltage but not over-current would be passed to the protected device. In situations where preventing this possibility is important, a voltage comparison capability can be added.

Figure 8:
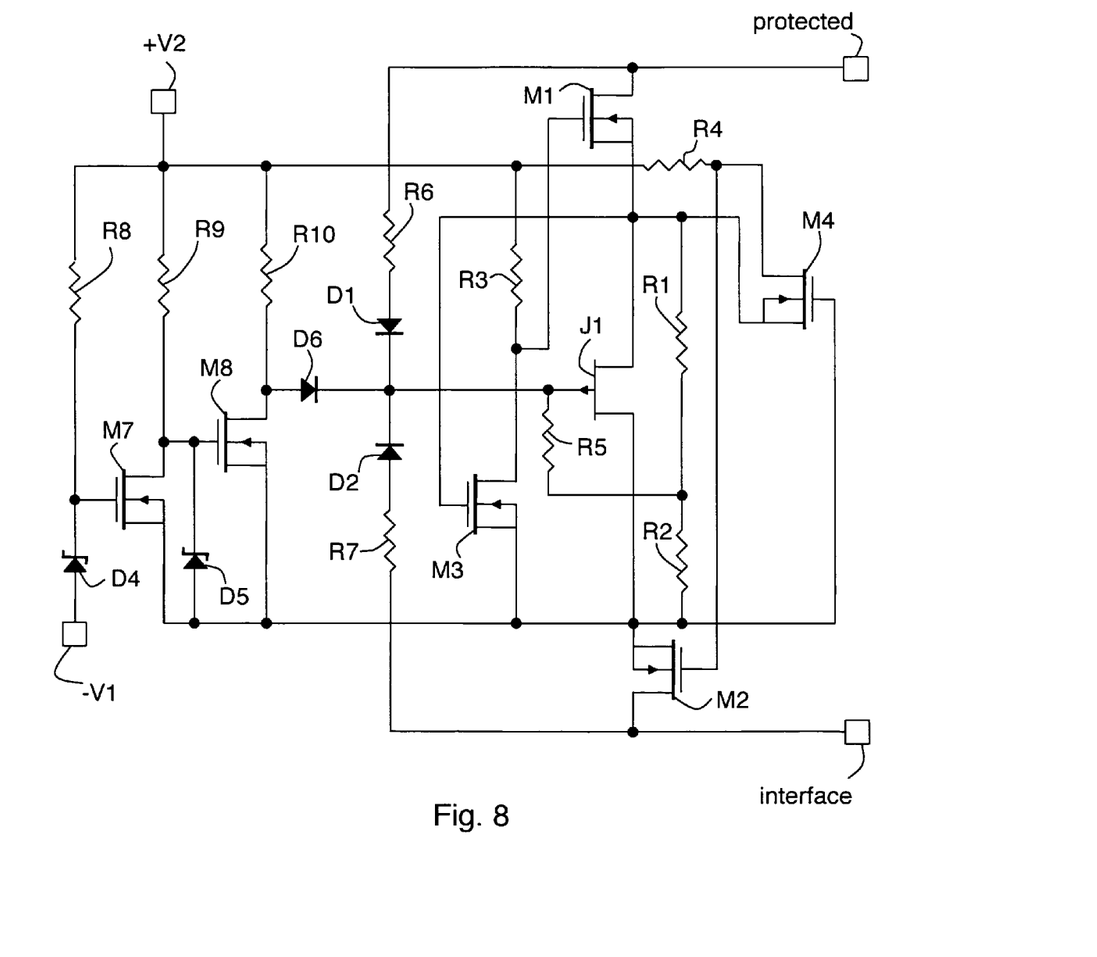
FIG. 8 is a schematic of a fifth embodiment of the invention.
Figure 9:
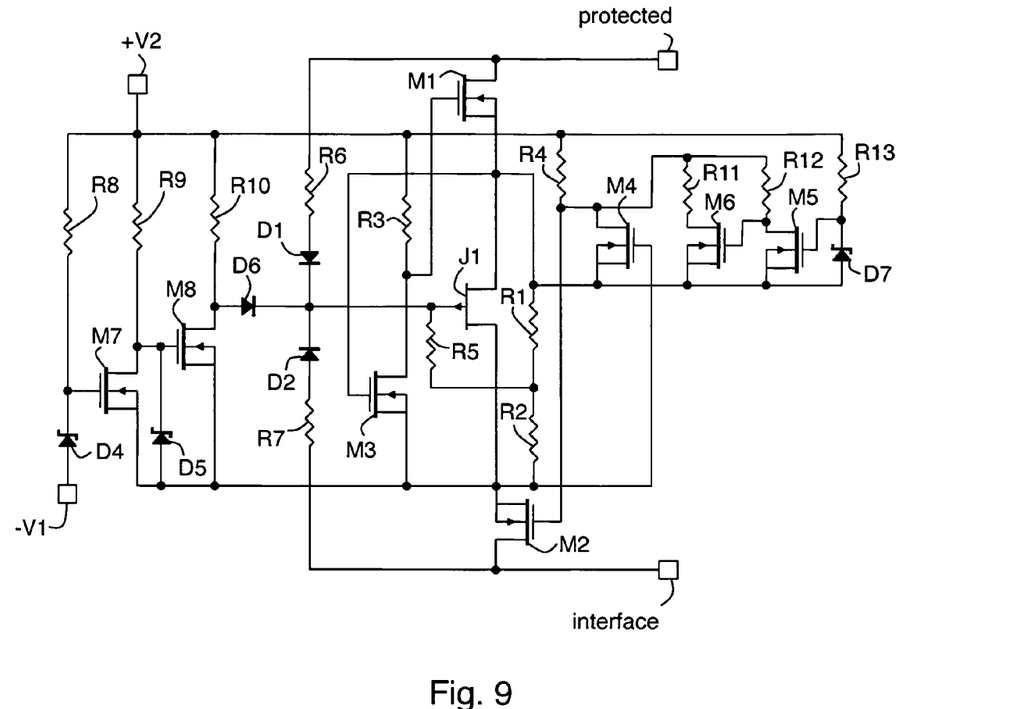
FIG. 9 is a schematic of a sixth embodiment of the invention.

FIGS. 8 and 9 show examples of such modified circuits that correspond to the examples of FIGS. 6 and 7, respectively. Here the positive voltage rail is referenced as +V2 and the negative voltage rail is referenced as −V1. In these examples, enhancement mode MOS transistors M7 and M8 in combination with resistors R1, R2, R5, R8-R10 and diodes D4-D6 act as a voltage comparison circuit. More specifically, this comparison circuit causes the TBU to turn off if the TBU output voltage goes close to or beyond the negative rail (−V1). When the TBU output voltage (Vout) drops below a voltage such that $V_{diode} - V_{th} = (Vout) - (-V1)$, the NMOS M7 is turned on, turning off NMOS M8. The rising voltage at the drain of M8 then turns off JFET J1. The diode voltage drop of D4, $V_{diode}$, can be chosen to compensate the threshold voltage, $V_{th}$, of M7, such that the TBU turns off as the output voltage Vout is pulled close to or lower than −V1. It may be advantageous to set this threshold either slightly higher or slightly lower than −V1 in certain applications for best protection performance by setting an appropriate diode voltage drop. In some cases, D4 may be connected as forward biased and a forward voltage diode drop can be used as the reference. In other cases, a combination of multiple forward biased diodes or forward and reverse biased diodes may be used for best compensation.

It can be seen that both functions of turning off the TBU in response to a voltage surge either above +V2 or below −V1 are achieved by devices M5/6 and M7/8 respectively. The resulting TBU circuit is readily integratable with a simple process that allows for simple low voltage auxiliary NMOS devices and high voltage, high value resistors.

The preceding description is by way of example as opposed to limitation. Many variations of the given examples will be apparent based on the preceding principles. Practice of the invention does not depend critically on the polarity and/or type of transistors employed in a TBU circuit. For example, the polarities of devices and voltage inputs can all be consistently reversed. PMOS transistors can be employed in place of NMOS transistors, such as M1 and M2, although NMOS devices are typically preferred because they tend to provide better electrical performance than PMOS devices for TBUs. In such a case of reversed polarities, the V1 and V2 polarities would now also be reversed, such that V2 becomes negative with respect to V1.

The invention claimed is:

1. A transient blocking unit (TBU) comprising:
   two or more primary transistors connected in series such that they automatically switch to a high-impedance state when a TBU current passing through each of said primary transistors between a TBU input and a TBU output exceeds a predetermined threshold magnitude; and
   one or more auxiliary transistors, each auxiliary transistor having its gate connected to a corresponding node between two of said primary transistors;
   wherein one or more of said primary transistors are enhancement mode devices; and
   wherein each of said enhancement mode devices has its gate connected to a corresponding one of said auxiliary transistors.

2. The TBU of claim 1, wherein said enhancement mode devices comprise one or more metal-oxide field effect transistors.

3. The TBU of claim 1, wherein one or more of said primary transistors are depletion mode devices.

4. The TBU of claim 3, wherein said depletion mode devices comprise one or more junction field effect transistors.

5. The TBU of claim 1, further comprising circuitry to provide a low resistance gate capacitance discharge path for one or more of said enhancement mode devices.

6. The TBU of claim 1, further comprising a voltage comparison circuit connected to said TBU to provide gate voltages to one or more of said primary transistors to turn off said one or more of said primary transistors, if an output voltage at said TBU output falls outside a predetermined voltage range.

7. The TBU of claim 1:
   wherein said primary transistors comprise a first enhancement mode transistor, a second enhancement mode transistor, and a depletion mode transistor connected between said first and second enhancement mode transistors;
   wherein a gate of said first enhancement mode transistor is connected to a first of said auxiliary transistors;
   wherein a gate of said second enhancement mode transistor is connected to a second of said auxiliary transistors;
   wherein a gate of said first auxiliary transistor is connected to a node between said depletion mode transistor and said first enhancement mode transistor; and
   wherein a gate of said second auxiliary transistor is connected to a node between said depletion mode transistor and said second enhancement mode transistor.

8. The TBU of claim 7, further comprising circuitry to provide a low resistance gate capacitance discharge path for one or more of said enhancement mode devices.

9. The TBU of claim 7, further comprising a voltage comparison circuit connected to said TBU to provide gate voltages to one or more of said primary transistors to turn off said one or more of said primary transistors, if an output voltage at said TBU output falls outside a predetermined voltage range.

\* \* \* \* \*